United States Patent
Lim et al.

(10) Patent No.: US 10,504,220 B2
(45) Date of Patent: Dec. 10, 2019

(54) NEURAL NETWORK FEATURE RECOGNITION SYSTEM

(71) Applicant: General Electric Company, Schenectady, NY (US)

(72) Inventors: Ser Nam Lim, Schenectady, NY (US); David Scott Diwinsky, West Chester, OH (US); Wei Wang, Niskayuna, NY (US); Swaminathan Sankaranarayanan, College Park, NY (US); Xiao Bian, Niskayuna, NY (US); Arpit Jain, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 378 days.

(21) Appl. No.: 15/605,243

(22) Filed: May 25, 2017

(65) Prior Publication Data
US 2018/0342069 A1 Nov. 29, 2018

(51) Int. Cl.
*G06K 9/00* (2006.01)
*G06T 7/00* (2017.01)

(52) U.S. Cl.
CPC .. *G06T 7/0008* (2013.01); *G06T 2207/10016* (2013.01); *G06T 2207/10024* (2013.01); *G06T 2207/20076* (2013.01); *G06T 2207/20081* (2013.01); *G06T 2207/20084* (2013.01); *G06T 2207/30164* (2013.01)

(58) Field of Classification Search
CPC combination set(s) only.
See application file for complete search history.

(56) References Cited

U.S. PATENT DOCUMENTS

| | | | |
|---|---|---|---|
| 8,391,603 B2 | 3/2013 | Tizhoosh et al. | |
| 8,413,493 B1 * | 4/2013 | Polywoda, III | G01M 15/14 73/112.01 |
| 8,943,008 B2 | 1/2015 | Ponulak et al. | |
| 9,008,840 B1 | 4/2015 | Ponulak et al. | |

(Continued)

OTHER PUBLICATIONS

Mathe et al. "Reinforcement Learning for Visual Object Detection" IEEE Conference on Computer Vision and Pattern Recognition (CVPR); Jun. 2016; 9 pages.

(Continued)

*Primary Examiner* — Alex Kok S Liew
(74) *Attorney, Agent, or Firm* — Philip S. Hof; The Small Patent Law Group LLC (57) ABSTRACT

A system includes one or more processors configured to analyze obtained image data representing a rotor blade to detect a candidate feature on the rotor blade and determine changes in the size or position of the candidate feature over time. The one or more processors are configured to identify the candidate feature on the rotor blade as a defect feature responsive to the changes in the candidate feature being the same or similar to a predicted progression of the defect feature over time. The predicted progression of the defect feature is determined according to an action-guidance function generated by an artificial neural network via a machine learning algorithm. Responsive to identifying the candidate feature on the rotor blade as the defect feature, the one or more processors are configured to automatically schedule maintenance for the rotor blade, alert an operator, or stop movement of the rotor blade.

20 Claims, 6 Drawing Sheets

(56) References Cited

U.S. PATENT DOCUMENTS

| | | |
|---|---|---|
| 9,189,730 B1 | 11/2015 | Coenen et al. |
| 9,296,101 B2 | 3/2016 | Laurent et al. |
| 2003/0023404 A1* | 1/2003 | Moselhi ............... G01N 21/954 |
| | | 702/181 |
| 2009/0266160 A1* | 10/2009 | Jeffrey .................. G01H 1/006 |
| | | 73/455 |
| 2011/0255794 A1 | 10/2011 | Neogi et al. |
| 2014/0133714 A1* | 5/2014 | Ivanov ............... G06K 9/00013 |
| | | 382/124 |
| 2015/0117752 A1* | 4/2015 | Ueno ..................... G06T 11/00 |
| | | 382/141 |

OTHER PUBLICATIONS

Malowany et al. "Visual Reinforcement Learning for Object Recognition in Robotics" IEEE International Conference on the Science of Electrical Engineering (ICSEE); Nov. 2016; 5 pages.

* cited by examiner

NEURAL NETWORK FEATURE RECOGNITION SYSTEM

FIELD

The subject matter described herein relates to image analysis systems that use one or more neural networks to provide feature recognition.

BACKGROUND

Neural networks can be used to analyze images for a variety of purposes. For example, some neural networks can examine images in order to identify objects or features depicted in the images. The neural networks can be established or modified (e.g., trained) to detect various objects in images by providing the neural networks with labeled training images. The labeled training images include images having known objects depicted in the images, with each pixel in the labeled training images identified according to what object or type of object the pixel at least partially represents.

But, the process for labeling training images is a time-consuming, costly, and/or laborious process due to the number of pixels in high definition training images. While some crowd-sourcing approaches have been used to reduce the time and/or cost involved in labeling the training images, not all images are available for public dissemination for the crowd-sourcing solutions. For example, medical images can be subject to laws that restrict dissemination of the images, images of certain objects (e.g., airplane engines) may not be open to public dissemination due to contractual and/or governmental restrictions, other images may be subject to privacy laws that restrict public dissemination, etc.

SUMMARY

In an embodiment, a system (e.g., a neural network feature recognition system) is provided that includes one or more processors configured to obtain image data representing a rotor blade that is imaged at different times. The one or more processors are configured to analyze the image data to detect a candidate feature on the rotor blade and determine changes in the candidate feature over time. The changes in the candidate feature represent one or more of a changing size or a changing position of the candidate feature relative to the rotor blade over time. The one or more processors are further configured to identify the candidate feature on the rotor blade as a defect feature responsive to the changes in the candidate feature being one or more of the same or similar to a predicted progression of the defect feature over time. The predicted progression of the defect feature is determined according to an action-guidance function that is associated with the defect feature and generated by an artificial neural network via a machine learning algorithm. Responsive to identifying the candidate feature on the rotor blade as the defect feature, the one or more processors are configured to one or more of automatically schedule maintenance for the rotor blade, automatically alert an operator, or automatically stop movement of the rotor blade.

In an embodiment, a method (e.g., for neural network feature recognition) is provided that includes obtaining image data representing a rotor blade that is imaged at different times. The method includes determining changes in a candidate feature on the rotor blade over time based on image analysis of the image data. The changes in the candidate feature represent one or more of a changing size or a changing position of the candidate feature relative to the rotor blade over time. The method further includes automatically identifying the candidate feature on the rotor blade as a defect feature responsive to the changes in the candidate feature over time being one or more of the same or similar to a predicted progression of the defect feature over time according to an action-guidance function that is associated with the defect feature. The action-guidance function is generated by an artificial neural network via a machine learning algorithm.

In an embodiment, a method (e.g., for neural network feature recognition) is provided that includes detecting a candidate feature on an object in a series of images acquired at different time and determining changes in the candidate feature relative to the object over time. The method also includes generating, using an artificial neural network, an action-guidance function that is used to predict a progression of the defect feature relative to the object over time. The action-guidance function is generated via reinforcement learning using a classifier network trained to detect the defect features in images as a supervisor to provide feedback to the artificial neural network. The method further includes automatically identifying the candidate feature on the rotor blade as the defect feature responsive to the changes in the candidate feature over time being one or more of the same or similar to the predicted progression of the defect feature according to the action-guidance function.

BRIEF DESCRIPTION OF THE DRAWINGS

The present inventive subject matter will be better understood from reading the following description of non-limiting embodiments, with reference to the attached drawings, wherein below.

DETAILED DESCRIPTION

One embodiment of the inventive subject matter described herein provides a feature recognition system and method for identifying specific features in image data based on changes in the imaged features over time. The feature recognition system uses one or more artificial neural networks to generate an action-guidance function associated with a specific type of feature. The action-guidance function represents a predicted progression of the feature relative to the surrounding environment over time. In one or more embodiments, the action-guidance function for a specific type of feature is generated by a neural network using a reinforcement learning machine algorithm. For example, the generation of the action-guidance function may be supported or weakly supervised by a classifier network, as described in more detail below.

Known systems and methods for object recognition in images involve various techniques based on identifying visual-related characteristics in images, such as color, texture, gradient, edges, contour, interest points, discriminative parts, attributes, etc. These known systems do not consider the comprehensive logic among the features from different locations on the target object.

One example of comprehensive logic is a drawn or handwritten sketch of an object, such as the letter "Z" in print or block form. When drawing the letter "Z" there is a latent logic that describes the step-by-step progression of pen strokes from a first stroke to a final stroke. For example, the first stroke starts at a top-left point or position and progresses rightward for a certain distance to a top-right position. A subsequent second stroke progresses from the top-right position diagonally to a bottom-left position, and a third, final stroke progresses from the bottom-left position rightward to a final, bottom-right position. The object in the completed drawing can be described and/or identified as the letter "Z" based on the visual-characteristics of the drawing (e.g., the contour, locations of straight lines, locations of edges between lines, etc.). However, the object in the drawing can also be described and/or identified using extracted logic by affiliating the sequence of pen strokes made during the drawing to the letter "Z". For example, no other letter in the English alphabet can be drawn by a first rightward pen stroke, followed by a second downward and leftward diagonal pen stroke and then a third rightward pen stroke in series. One of the benefits of extracting the logic (or progression) of the generation of an object is that the object can be described and identified without relying on specific visual descriptors, such as line lengths, the linearity of the lines, or the angles between the lines. For example, since people have different handwriting, the letter "Z" written by different people can have various different appearances, but only a few different sequences of pen strokes. Therefore, it may be easier to program a machine to automatically identify the letter "Z" (and other objects) by learning possible variations in the logic or sequence of moves to create the handwritten letter "Z" than by attempting to learn all of the variations in the appearance of the handwritten letter "Z".

One or more embodiments described herein disclose an approach for object recognition based on the logic embedded among different object parts, especially the discriminative parts on the contour of an object. In the approach, a limited number of local image patches are automatically explored, such as around an object contour, to formulate the logic among the local patches. The formulated logic can thereafter be used for object description and identification. In one or more embodiments described herein, the object that is imaged is a rotor blade of a rotor assembly. The rotor assembly may be part of a gas turbine engine, a turbocharger, or the like. The imaged rotor blade can be analyzed for detection of defect features that indicate damage to the blade. The defect features may be cracks, spalling, or the like. For example, formulated logic associated with the progression of defect features on rotor blades over time, such as a predicted rate of expansion, a predicted direction of expansion, and the like, is used to identify whether or not a candidate feature that is detected on a series of images of a rotor blade is one of the defect features.

In one or more embodiments, reinforcement learning is used to formulate the logic associated with the progression of the defect features over time. Reinforcement learning is a type of machine learning algorithm that concerns how machine agents ought to take actions in an environment, so as to increase (e.g., in an attempt to maximize) some notion of cumulative reward. Reinforcement learning can be used to automatically train an artificial neural network over an iterative process. For example, a neural network performs various episodes that each includes a sequence of actions of an agent in an environment according to a set of policies or rules. During each action, the agent transitions from one state to a next state. At the end of each episode, if the agent achieves a designated goal (e.g., winning a game or reaching a designated location in the environment), then the agent is rewarded by increasing weights associated with the set of policies used to accomplish the goal. On the other hand, if the agent does not achieve the designated goal at the end of an episode, then the agent is not rewarded. For example, the weights associated with the set of policies used in that episode may be decreased. Over many iterations, the neural network is trained to take actions that more frequently result in achieving the designated goal relative to earlier iterations of episodes. The set of policies that are used to select or guide the actions of the agent in the environment at the end of reinforcement learning can be described in an action-guidance function that represents the logic of how the agent should move in the environment.

At least one technical effect of the subject matter described herein includes automatically training a neural network to formulate a function that describes progression of a defect feature on a rotor blade over time without having to provide labeled training images to the neural network. For example, the neural network can be trained automatically using reinforcement training, which conserves time, effort, and money relative to labeling the pixels of training images and inputting the labeled training images into the neural network. At least another technical effect of the subject matter described herein includes the ability to recognize specified features, such as cracks or spalling in a rotor blade, by tracking changes in the features over time. Thus, since the systems and methods described herein do not compare the final appearance of the features to known appearances of the specified features, the systems and methods described herein may perform less image analysis and may be less vulnerable to appearance variations caused by inconsistent lighting, shadows, and the like. Therefore, the systems and methods described herein may be more accurate at feature recognition than known systems and methods for image feature recognition.

Figure 1:
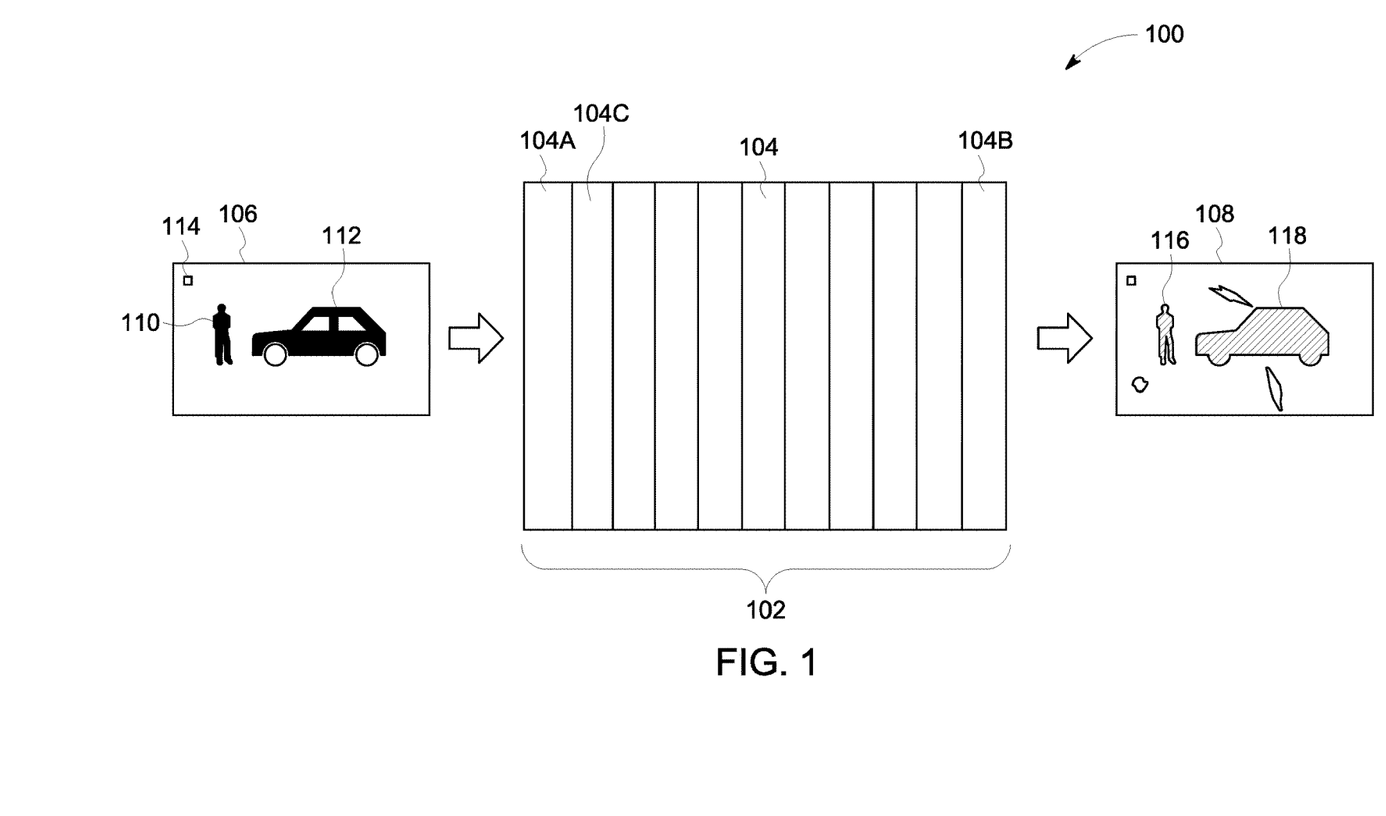
FIG. 1 illustrates one embodiment of a neural network system used for image analysis.

FIG. 1 illustrates one embodiment of a neural network system 100 used for image analysis. The neural network system 100 provides automated object-of-interest detection and recognition in images using one or more deep neural networks 102. The neural network 102 is an artificial neural network formed from one or more processors (e.g., microprocessors, integrated circuits, field programmable gate arrays, or the like). The neural network 102 is divided into two or more layers 104, such as an input layer 104A that receives an input image 106, an output layer 104B that outputs an output image 108, and one or more intermediate layers 104C between the input layer 104A and the output layer 104B. The layers 104 of the neural network 102 represent different groups or sets of artificial neurons or nodes, which can represent different functions performed by the one or more processors on the input image 106 to identify objects in the input image 106. The artificial neurons apply different weights in the functions applied to the input image 106 to attempt to identify the objects in the input image 106.

The output image 108 is generated by the neural network 102 by assigning or associating different pixels in the output image 108 with different object classes based on analysis of characteristics of the pixels. An object class is a type or category of an object appearing in the image. For example, a human body can be one object class, and an automobile is a different, second object class. A pixel can be labeled (e.g., associated) with probabilities that the pixel represents various different object classes by a vector [a b c d], where the values of a, b, c, and d indicate the probability of the pixel representing each of different classes of objects or things. Because the neural network 102 may not be 100% accurate in predicting what objects are represented by different pixels, the output image 108 may not exactly resemble or depict the objects in the input image 106, as shown in FIG. 1.

The artificial neurons in the layers 104 of the neural network 102 can examine individual pixels 114 that form the input image 106. The processors (operating as the artificial neurons) can use linear classification to calculate classification scores for different categories of objects (referred to herein as "classes"), such as a tree, a car, a person, spalling of a thermal barrier coating, a crack in a surface, a sign, or the like. These classification scores can indicate the probability that a pixel 114 represents different classes. For example, the classification score for a pixel 114 can be represented as a vector (e.g., the vector [a b c d] described above). The classification score is referred to herein as a classification vector. Each artificial neuron can apply a mathematical function, such as an activation function, to the same pixel, with the functions applied by different neurons impacting the functions applied by other neurons. Different neurons may apply different weights to different terms in the functions than one or more, or all other neurons. Application of the functions generates the classification vectors for the pixels 114, which can be used to identify the objects in the input image 106.

In one embodiment, the input image 106 is provided to the neural network 102 via one or more wired and/or wireless connections from a source, such as a camera or borescope. The neurons in the layers 104 of the neural network 102 examine the characteristics of the pixels 114 of the input image 106, such as the intensities, colors, or the like, to determine the classification vectors for the various pixels 114. The layers 104 of artificial neurons in the neural network 102 can examine the input image 104 in sequential order, with a first intermediate (or hidden) layer 104C of the neurons examining each pixel 114, followed by the neurons in a second intermediate layer 104C, followed by the neurons in a third intermediate layer 104C, and so on, to calculate the classification vectors of the pixels 114. The application of functions to characteristics of a pixel 114 by the neurons in a layer 104 is based on the results of the functions applied by the neurons in the preceding layers 104 in the neural network 102.

After the layers 104 of the neural network 102 have determined the classification vectors for the pixels 114, the neural network 102 examines the classification vector of each pixel 114 and determines which object class has the highest probability for each pixel 114 or which object class has a higher probability than one or more, or all, other object classes for each pixel 114. For example, a first pixel in the input image 106 having a classification vector of [0.6 0.15 0.05 0.2] indicates that the neural network 102 calculated a 60% probability that the first pixel represents a first object class (e.g., a human body or person), a 15% probability that the first pixel represents a second object class (e.g., a car), a 5% probability that the first pixel represents a third object class (e.g., a tree), and a 20% probability that the first pixel represents a fourth object class (e.g., the ground).

The output image 108 is a representation based on the determined probabilities for the pixels 114 in the input image 106. For example, different areas 116, 118 in the output image 108 are representative of the objects 110, 112, respectively, in the input image 106. The areas 116, 118 may slightly represent the corresponding objects 110, 112, but do not accurately represent or indicate the objects 110, 112 due to the probabilities in the classification vectors for at least some of the pixels 114 being less than 100%. The processors can determine that each pixel 114 represents the object class having the greatest or largest probability in the corresponding classification vector for that pixel 114. For example, the processors can determine that the first pixel described above represents a human person due to the 60% probability. This process can be repeated for several, or all, other pixels 114 in the input image 106.

The weight values associated with each vector and neuron in the network constrain how input images are related to outputs of the neurons. Weight values can be determined by the iterative flow of training data through the network. For example, weight values are established during a training phase in which the network learns how to identify particular object classes by typical input data characteristics of the objects in training or ground truth images. During the training phase, labeled training or ground truth images are input into the artificial neural network. A labeled training image is an image where all or a substantial portion of the pixels forming the image are associated with an object class. In a labeled training image, a pixel labeled as [1 0 0 0] can indicate that there is a 100% probability that the pixel represents at least a portion of an object of a first class (e.g., object class human body represented by probability a), a zero probability that the pixel represents at least a portion of an object of a different, second class (e.g., object class automobile represented by probability b), a zero probability that the pixel represents at least a portion of an object of a different, third class (e.g., object class ground represented by probability c), and a zero probability that the pixel represents at least a portion of an object of a different, fourth class (e.g., object class tree represented by probability d).

Additional training of the neural network 102 using labeled training images or ground truth images can improve the accuracy of the neural network 102 at recognizing objects in images that are input into the neural network 102, such that the objects 116, 118 in the output image 108 more closely resemble the corresponding objects 110, 112 in the input image 106. Additional training of the neural network 102 can improve the accuracy by increasing the determined probabilities that given pixels represent specific classes of the multiple object classes. The probabilities are increased by modifying the weights and/or functions of the artificial neurons in the different layers 104.

Figure 2:
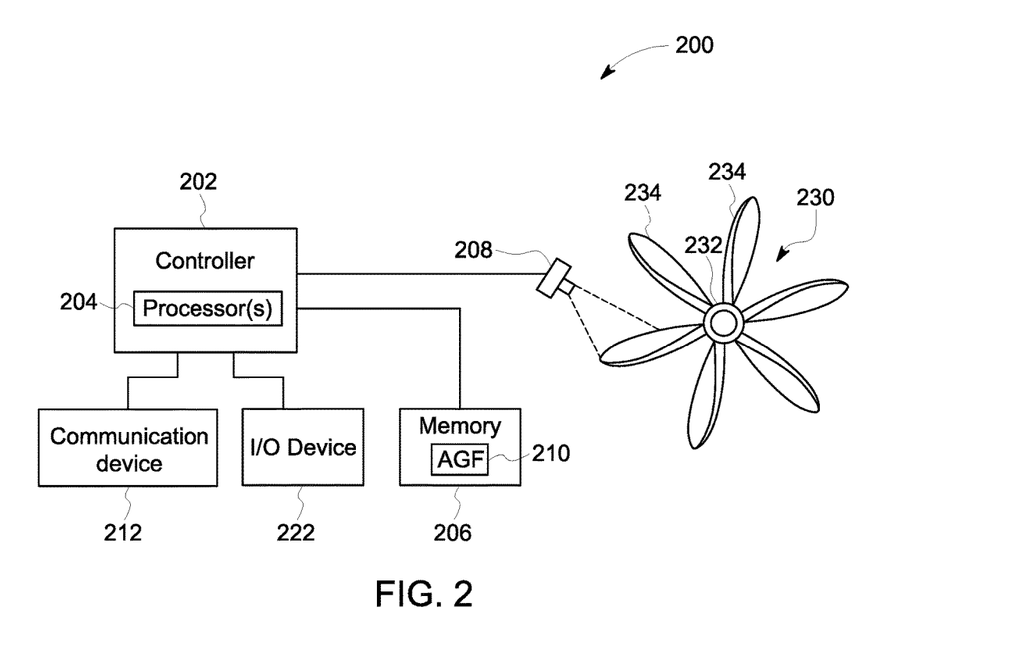
FIG. 2 is a block diagram of a feature recognition system according to an embodiment.

FIG. 2 is a block diagram of a feature recognition system 200 according to an embodiment. The feature recognition system 200 includes one or more neural networks that may be similar to the neural network system 100 shown in FIG. 1. The feature recognition system 200 includes a controller 202 that is operably coupled to a memory 206, which is a tangible and non-transitory computer readable medium. The controller 202 is configured to control the operation of the feature recognition system 200. The controller 202 includes one or more processors 204. The controller 202 includes and/or represents one or more hardware circuits or circuitry that include, are connected with, or that both include and are connected with one or more processors, controllers, and/or other hardware logic-based devices. The controller 202 may include a central processing unit (CPU), one or more microprocessors, a graphics processing unit (GPU), or any other electronic component capable of processing inputted data according to specific logical instructions. For example, the controller 202 may execute instructions stored on the memory 206 or stored on another tangible and non-transitory computer readable medium.

In one embodiment, the memory 206 is a digital storage device that stores an action-guidance function (AGF) 210. The AGF 210 may be generated or formulated by a neural network, such as the neural network 102 shown in FIG. 1. The AGF 210 is used to characterize and predict a progression of a defect feature on an object over time, as described below with reference to FIG. 3. The memory 206 may include or represent a flash memory, RAM, ROM, EEPROM, and/or the like. The controller 202 may access the memory 206 to use the AGF 210 for automatically determining whether or not an object, captured in image data, is damaged. More specifically, the controller 202 can use the AGF 210 for automatically determining whether a detected candidate feature in the image data can be classified as a defect feature on the object. The memory 206 optionally may also store the captured image data of the object and/or one or more artificial neural networks, such as the one or more neural networks used to generate the AGF 210.

The controller 202 is configured to obtain image data that represents an object. The image data is acquired or captured over time. For example, the image data may be a series of still images and/or one or more videos. In an embodiment, the image data is acquired or captured by an imaging device 208. The imaging device 208 is a sensor, scanner, or camera that acquires image data of an environment within a field of view of the device 208. The imaging device 208 may be configured to acquire still images and/or video in two dimensions or three dimensions.

The imaging device 208 in the illustrated embodiment is positioned and oriented to acquire the image data of a rotor assembly 230, which represents the target object. The rotor assembly 230 includes a central drum or shaft 232 and multiple rotor blades 234 extending radially outward from the drum 232. The blades 234 are spaced apart along a perimeter of the drum 232. In an embodiment, the rotor assembly 230 may be a turbine used in a power plant, a turbine (or jet) engine, a turbocharger, or the like. For example, the rotor assembly 230 may be a component of a gas turbine engine, and the blades 234 may be airfoils of the turbine engine. The rotor assembly 230 rotates around the drum 232. The imaging device 208 may be configured to acquire the image data of the rotor assembly 230 as the rotor assembly 230 rotates or while the rotor assembly 230 is motionless. For example, the imaging device 208 may be configured to acquire the image data periodically, such as once every day, once every week, once every month, once every time the rotor assembly 230 is stopped, or the like. The imaging device 208 may also be configured to acquire a different set of image data corresponding to each of the multiple blades 234 of the rotor assembly 230. Since the image data is acquired or captured over time, the image data showing the same blade 234 at different times can be compared in order to detect changes in the blade 234 over time. In an alternative embodiment, instead of a rotor assembly, the target object captured by the imaging device 208 may be another component of an engine, a building, a wheel or another component of a vehicle, or the like.

The controller 202 may receive the image data representing the rotor assembly 230 (or another target object) directly from the imaging device 208 via a wired or wireless pathway. Alternatively, the imaging device 208 may store the image data in an internal storage device on the imaging device 208 or at a remote server, and the controller 202 receives the image data from the internal storage device or the remote server periodically or upon request.

The controller 202 may be operably coupled to a communication device 212. The communication device 212 may include hardware such as a transceiver, receiver, transmitter, and/or the like, and associated circuitry (e.g., antennas) wirelessly communicating (e.g., transmitting and/or receiving) with the imaging device 208. The communication device 212 may also be configured to wirelessly communicate with a remote server, a mobile device (e.g., held by an operator) or other remote computer, or the like. The communication device 212 may be configured to establish a bi-directional communication link with a communicating device, such as the imaging device 208, using protocol firmware that may be stored in the memory 206 or another tangible and non-transitory computer readable medium. For example, the protocol firmware may provide network protocol syntax for the communication device 212 to assemble data packets, establish and/or partition data received along the bi-directional communication links, and/or the like.

Optionally, the controller 202 is operably coupled to an input/output (I/O) device 222. The I/O device 222 may include a display and/or a user interface that allows an operator to interact with the controller 202. The display may be a liquid crystal display (e.g., light emitting diode (LED) backlight), an organic light emitting diode (OLED) display, a plasma display, a CRT display, and/or the like. The display may be configured to display input images and/or output images stored in the memory 206. The user interface is configured to receive inputs from the operator of the feature recognition system 200. The user interface may include a keyboard, a mouse, a touchpad, one or more physical buttons, and/or the like. Optionally, the display may be a touch screen display, which includes at least a portion of the user interface. Optionally, the I/O device may include additional outputs, such as audio speakers, vibrating devices, or the like, for alerting the operator.

Figure 3:
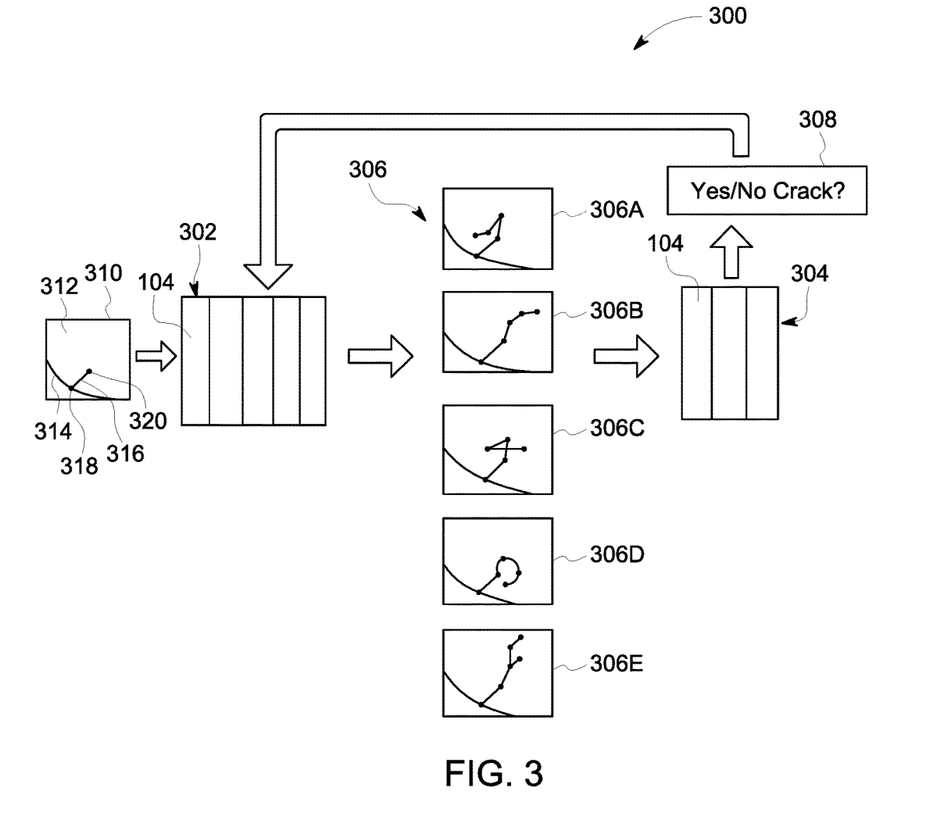
FIG. 3 is one embodiment of a neural network system used for generating an action-guidance function that characterizes the progression of a defect feature on a rotor blade over time.

FIG. 3 is one embodiment of a neural network system 300 used for generating an action-guidance function that characterizes the progression of a defect feature on a rotor blade over time. The neural network system 300 includes a generator neural network 302 and a classifier neural network 304, referred to herein as a generator network 302 and a classifier network 304. The generator network 302 and the classifier network 304 may be similar to the artificial neural network 102 shown in FIG. 1. For example, the generator network 302 and the classifier network 304 are composed of multiple layers 104 of artificial neurons. FIG. 3 illustrates a machine learning algorithm that teaches or trains the generator network 302 how to generate the action-guidance function 210 (shown in FIG. 2). In one embodiment, the machine learning algorithm is a reinforcement learning algorithm, and the classifier network 304 provides limited (or "weak") supervision or reinforcement of the generator network 302 during the training phase of the generator network 302.

The classifier network 304 is previously-trained to detect the presence of specific types of objects in images. In the illustrated embodiment, the classifier network 304 is trained to detect the presence of one or more rotor blade defect features in input images. For example, the defect features on the rotor blades may be cracks, spalling on a coating or barrier of the blades, oxidation (e.g., rust), a specific type of external debris on the blades, or the like. In the illustrated embodiment, the classifier network 304 is trained to detect cracks in rotor blades that are depicted in input images. For example, the classifier network 304 is configured to detect the presence or absence of a crack in an input image, but optionally is not sophisticated enough to identify the location of a detected crack in the input image. Therefore, the output of the classifier network 304 in response to receiving an input image is either "Yes," the image includes a crack or "No," the image does not include a crack, as shown at 308. The classifier network 304 may have been previously trained by feeding the classifier network 304 hundreds or thousands of labeled training images (not shown). For example, the training images may be each labeled on an image-by-image basis as "Yes, depicting a crack" or "Not depicting a crack," and not on an individual pixel-by-pixel basis. The trained classifier network 304 is able to receive an input image, and determine whether or not the input image includes a crack.

As shown in FIG. 3, the generator network 302 receives an input base image 310 that represents a portion of a rotor blade 312, including a section of an edge or contour 314 of the blade 312. The base image 310 also depicts a first state of a crack 316 that extends from a first point 318 along the edge 314 to a second point 320. The generator network 302 is configured to generate sample images 306 that represent predicted progressions of the crack 316 over time. For example, the sample images 306 show predicted progressions of the crack 316 at a fourth state, meaning three actions after the first state shown in base image 310. The states represent static conditions of the crack 316, and the different states in the sample images 306 are indicated by dots. The generator network 302 produces the predicted progressions by selecting one action at a time, starting at the second point 320. The generator network 302 follows a set of prescribed policies or rules when selecting which action to take between each state. For example, the rules may correspond to directions of movement, distances of movement, or the like, between each state. Initially, the generator network 302 is unaware of how a crack on a rotor blade progresses over time, so the progressions in the sample images 306 may appear random.

The sample images 306 generated by the generator network 302 are input to the classifier network 304 (via a wired or wireless connection), and the classifier network 304 is configured to determine at 308 whether or not a crack is depicted in each sample image 306. For example, the classifier network 304 may compare the visual appearance of the sample images 306 to known, ground truth images of cracks. The goal of the generator network 304 is to generate progressions that appear to be cracks to the trained classifier network 304. The classifier network 304 may determine that the sample image 306A does not depict a crack because cracks do not typically reverse or turn around in the direction of expansion, as shown in the image 306A. The classifier network 304 communicates to the generator network 302 via a wired or wireless connection that no crack was detected in the image 306A. Since the goal was not satisfied with respect to the image 306A, the generator network 302 may be configured to label each of the three actions made from the initial point 320 as "bad," which at least slightly discourages such actions in the future. For example, the actions may be selected based on internal parameters or weighted functions. In response to not meeting the goal, the generator network 302 may update the parameters or weighted functions to at least slight discourage the same or similar actions when generating future progressions.

The classifier network 304 may determine that the sample image 306B does, in fact, depict a crack because the progression shown in the image 306B is at least similar to the appearance of an actual crack in a rotor blade. As a result, the generator 302 labels each of the three actions made in the progression in the image 306B as "good," such that the same or similar actions are at least slightly encouraged when generating future progressions. With regard to the sample images 306C and 306D, the classifier network 304 determines that these images do not depict cracks because cracks do not typically intersect themselves, as shown in image 306C, or form generally circular curves, as shown in image 306D. The classifier network 304 may determine that the image 306E does, in fact, depict a crack, because some cracks do have branches. Although only five sample images 306A-E are shown in FIG. 3, the generator network 302 may be trained by generating hundreds or thousands of sample images 306. The adjustments made to the parameters or weighted functions in response to the classifier network 304 analyzing the sample images 306A-E affect the action-selection of the generator network 302 for generating subsequent sample images 306. Therefore, over time and many iterations, the generator network 302 is trained how to select actions that result in a progression that is similar to how an actual crack expands over time along a rotor blade.

In an embodiment, once the generator network 302 is trained, the generator network 302 can generate an action-guidance function (e.g., the action-guidance function 210 shown in FIG. 2) that is associated with predicted crack progression on a rotor blade. For example, once the generator network 302 is trained, the embedded logic used by the generator network 302 to produce the sample images 306 (that the classifier network 304 identifies as representing actual cracks) can be extracted and formulated into the action-guidance function.

The action-guidance function can be defined as $F(S_n)=A_z$, where z is an action set, $S_n$ is a state, and $A_z$ is a determined action that the algorithm should take from the given state $S_n$. The action set (z) may be defined as potential directions and step lengths of actions. For example, the action set may include eight directions and eight step lengths, which provides 64 (8×8) possible actions from a given state to a subsequent state. The state $S_n$ refers to a static condition of the crack at a given time. The state $S_n$ may be characterized by a length of the crack at the given time, a total area or number of pixels represented by the crack at the given time, or a position of a leading end of the crack at the given time. For example, a crack at a first state has a first length, but the crack may expand over time such that the crack is longer at a later state. As a crack expands, the leading end of the crack is located at different positions relative to the rotor blade over time. For example, the leading end of the crack in the base image 310 in FIG. 3 is located at the second position 320 at the state depicted in the base image 310, but the leading ends of the cracks are located at different positions spaced apart from the second position 320 of the crack during later states depicted in the sample images 306 in FIG. 3.

The action-guidance function is configured to provide an estimated or predicted progression of a crack over time. For example, by inputting a current state of a crack and a designated amount of time into the action-guidance function, the function can output a predicted resultant state of the crack after the designated amount of time has elapsed. The predicted resultant state of the crack may be characterized by the length of the crack, the area of the crack, or a position of the leading end of the crack. Thus, the action-guidance function is configured to predict a trajectory of the expanding crack over time. The trajectory or progression of the crack is "predicted" because the action-guidance function is based on probabilities and cannot determine future expansion characteristics of a crack with certainty.

The action-guidance function described above is associated with cracks in rotor blades, but one or more additional action-guidance functions may be generated that are associated with other defect features. For example, a second action-guidance function may be generated that is associated with spalling on a coating or barrier of the rotor blade. The second action-guidance function may be generated by the generator network 302 or a different artificial neural network via the reinforcement learning algorithm using a classifier network trained to detect spalling in images. Optionally, a different action-guidance function may be generated that is specific to each of multiple different types of potential defect features that may be found on a rotor blade (or a different imaged object).

In the embodiment described above, the action-guidance function is generated by the generator neural network 302 that is trained via a reinforcement learning algorithm with the support of the classifier network 304. In other embodiments, the action-guidance function may be generated by a neural network that is trained via a different machine learning algorithm. For example, the generator network 302 may be a component of a generative adversarial network (GAN) system that also includes a discriminator neural network. In a GAN system, the generator and discriminator networks are configured to interact in a setting of a two-player minimax game in which the generator network learns how to generate "fake" images depicting cracks on a rotor blade (or other features on an object) that are perceptually similar to actual or "real" image data acquired from an imaging device (e.g., camera), such that the discriminator network mistakenly determines that the generated images are actual images.

Figure 4:
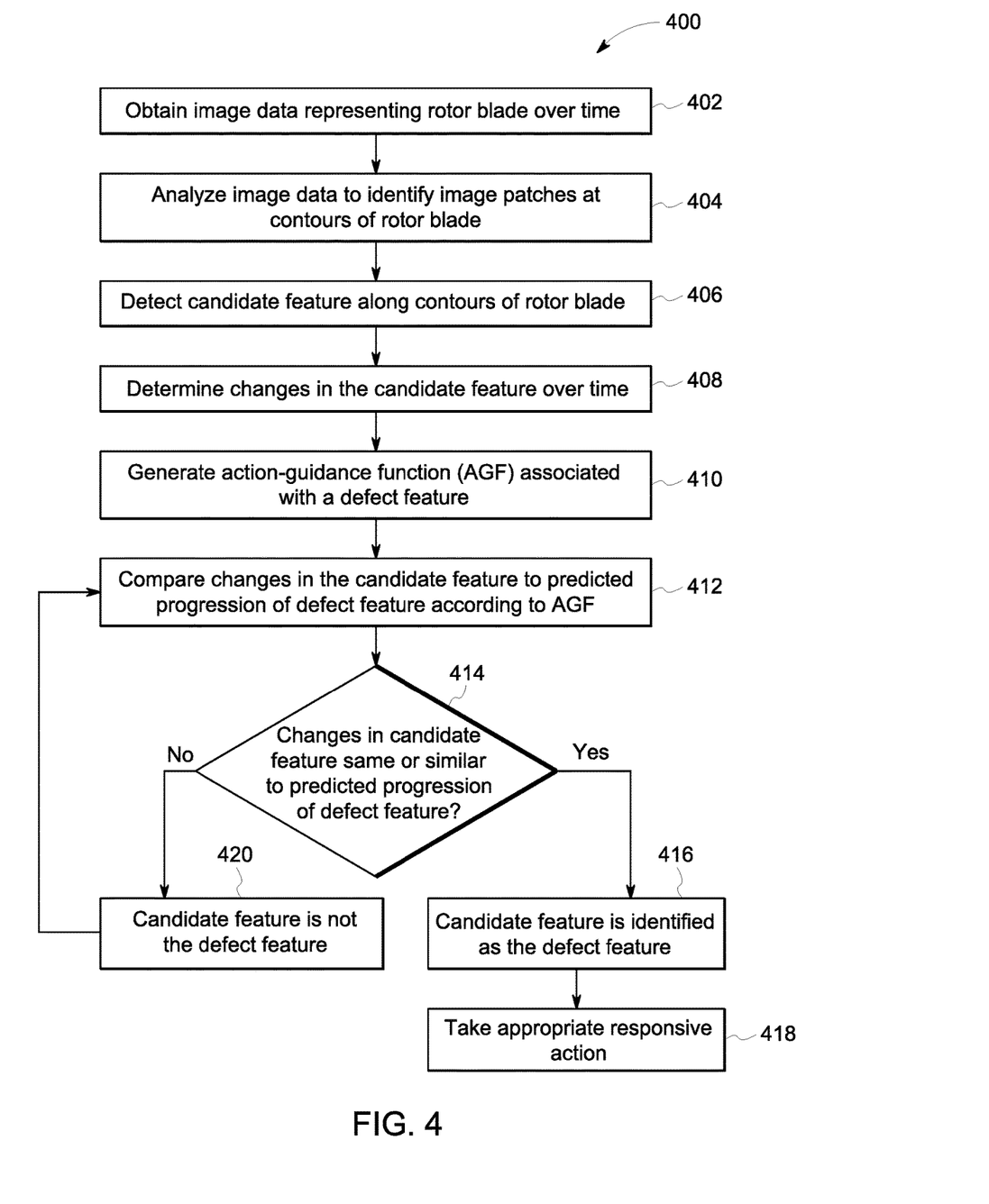
FIG. 4 is a flowchart of one embodiment of a method for feature recognition in image data using one or more deep neural networks.

FIG. 4 is a flowchart of one embodiment of a method 400 for feature recognition in image data using one or more deep neural networks. The feature recognition in the method 400 is based on a predicted progression of a defect feature over time, instead of visual characteristics (e.g., shapes) of the defect feature. The method 400 can represent the operations performed by the one or more processors 204 of the controller 202 shown in FIG. 2 and/or processors of the neural network 102 shown in FIG. 1. The method 400 can represent an algorithm used to create (e.g., write) one or more software applications that direct operation of one or more processors and/or neural networks.

At 402, image data representing a rotor blade of a rotor assembly is obtained. The image data may be a series of images or a video captured over time by an imaging device. The imaging device is positioned such that a field of view of the imaging device includes the rotor blade. The image data depicts the rotor blade at different times. For example, the image data may acquire a different image of the rotor blade periodically, such as once an hour, once a day, or once a week. The image data may be obtained by one or more processors through a wired or wireless connection from the imaging device or from a storage device or server.

At 404, the image data is analyzed to identify image patches at contours or edges of the rotor blade. The image patches are sub-areas of the image. A single image may be segmented into any number of image patches. Each image patch includes multiple pixels. For example, a single image may be segmented into 64 different image patches, and each patch may include 64 pixels. The image patches at the contours may be identified because some defect features have a higher probability of being located at or near the contours of the rotor blade than at locations farther away from the contours. Thus, by identifying image patches at the contours, the amount of image data to be analyzed in more detail is reduced since the remaining image patches can be ignored or neglected. In one embodiment, the image patches at the contours are identified by using an edge detection technique, such as canny edge detection or the like.

Figure 5:
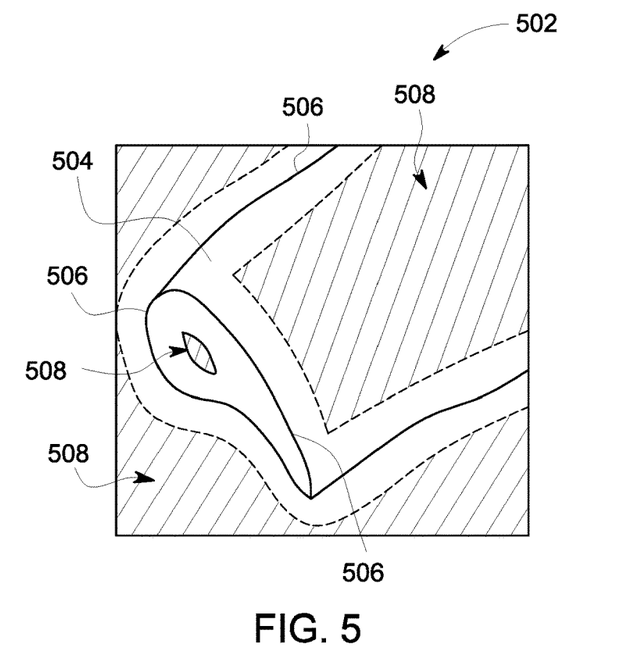
FIG. 5 shows an image of a rotor blade according to an embodiment.

FIG. 5 shows an image 502 of a rotor blade 504 according to an embodiment. The image has been analyzed to identify the image patches at or near the contours 506 of the blade 504 by using an edge detection technique. The areas of the image 502 outside of the identified image patches are identified as dead zones 508 that can be ignored or neglected.

At 406, a candidate feature is detected in the image patches at or proximate to the contours of the rotor blade. The candidate feature may be detected by analyzing the pixels of the image patches. The pixels may be analyzed by one or more processors classifying the pixels based on characteristics such as color or intensity. Optionally, the pixels may be analyzed by artificial neurons in layers of an artificial neural network. The candidate feature may be detected in response to recognizing that a group of proximate pixels have similar characteristics that are also at least similar to known characteristics associated with a defect feature. The candidate feature may also be detected in response to recognizing that the characteristics of the pixels in the group are different than characteristics of the pixels surrounding the group. The candidate feature represents an unidentified aspect that is detected in the image data of the rotor blade. The candidate feature potentially represents a defect feature, such as a crack, spalling, oxidation, or debris on the blade.

Figure 6A:
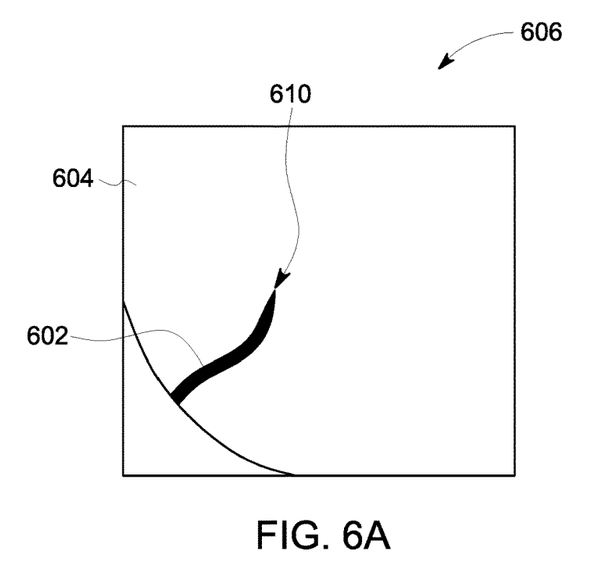
FIGS. 6A and 6B show close-up views of a candidate feature on a rotor blade in different images acquired at two different times.
Figure 6B:
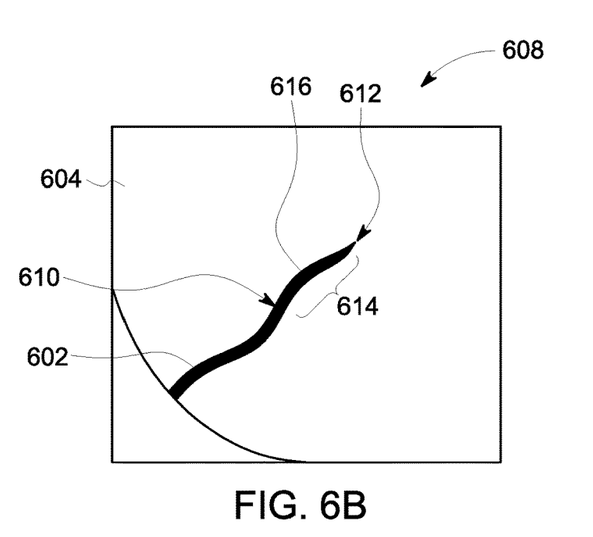

At 408, changes to the candidate feature over time are determined based on the image data. Once the candidate feature is detected in one of the images, then one or more processors may analyze corresponding image patches or corresponding areas in the other images of the rotor blade to detect the candidate feature in the other images. The candidate features in the different images represent a common feature on the rotor blade imaged or captured at different times. For example, FIG. 6A shows a close-up view of a candidate feature 602 on a rotor blade 604 in a first image 606 acquired at a first time, and FIG. 6B shows the close-up view of the candidate feature 602 in a second image 608 acquired at a second, subsequent time. The second time may be a month, six months, a year, or the like after the first time. As shown, the candidate feature 602 in the second image 608 has at least a slightly different shape (e.g., is longer) than the candidate feature 602 in the first image 608, which indicates that the candidate feature 602 has changed over time.

The one or more processors may determine the extent and/or type of changes in the candidate features over time by comparing characteristics of the candidate features, such as the areas, lengths, or positions of leading ends of the candidate features. The areas and lengths of each candidate feature may be determined by counting the number of pixels that have colors and/or intensities representative of the candidate feature. Alternatively, the areas and lengths may be determined by measuring the candidate features using a unit of measurement (e.g., mm) other than number of pixels. The positions of leading ends of the candidate features may be determined based on analyzing the pixels to identify a pixel at the end of a branch of pixels representing the candidate feature. In FIG. 6A, the leading end of the candidate feature 602 is located at a first position 610 relative to the rotor blade 604, and in FIG. 6B the leading end is located at a different, second position 612 relative to the rotor blade 604. By comparing the characteristics of the candidate features 602 in the first and second images 606, 608, the one or more processors can determine that the candidate feature 602 expanded a length 614 in the amount of time between capturing the first and second images 606, 608. For example, the candidate feature 602 in the second image 608 has an extended segment 616 that is not present in the candidate feature 602 shown in the first image 606. The extended segment 616 extends from the first position 610 to the leading end at the second position 612. Although FIGS. 6A and 6B only show the candidate feature 602 in two images 606, 608, changes in a common candidate feature can be determined across many different images of the candidate feature to determine how the candidate feature changes (e.g., expands) over time.

At 410, an action-guidance function associated with a defect feature is generated. The action-guidance function in one embodiment is generated to predict the progression or expansion of a crack along a rotor blade. Optionally, additional action-guidance functions may be generated that are associated with the progression of other defect features, such as spalling or oxidation (e.g., rust), along a rotor blade. The action-guidance function may be generated by an artificial neural network via a machine learning algorithm. For example, the action-guidance function may be generated by the generator network 302 shown in FIG. 3 via reinforcement learning with the support of the classifier network 304. The action-guidance function is formulated based on extracted logic related to the progression of the associated defect feature. Based on a given state of the defect feature, the action-guidance function is configured to predict subsequent actions (or expansion activity) of the defect feature over time. The predicted progression of the defect feature may be characterized by the action-guidance function in a predicted rate of expansion of the defect feature over time (e.g., predicted expansion rate), a predicted direction of expansion of the defect feature over time (e.g., predicted expansion direction), a predicted location or position of a leading end of the defect feature at a given time relative to the rotor blade, or the like.

At 412, the changes in the candidate feature over time are compared to the predicted progression of the defect feature according to the action-guidance function. For example, starting at a given state of the candidate feature, the measured change in the candidate feature over a designated amount of time based on the image data is compared to the predicted progression of a crack according to the action-guidance function when starting at the same state and expanding over the same amount of time. In an illustrated example, the state of the candidate feature 602 in FIG. 6A may be considered as an initial state that is input into the action-guidance function along with the amount of time that elapsed between capturing the first and second images 606, 608 in FIGS. 6A and 6B, respectively. Based on these inputs, the action-guidance function can calculate, as an output, a predicted expansion direction, expansion rate, shape of the expanded segment 616, size of the expanded segment 616, and/or location of the leading end of the candidate feature 602 (assuming that the candidate feature 602 is a crack in the rotor blade).

Figure 7:
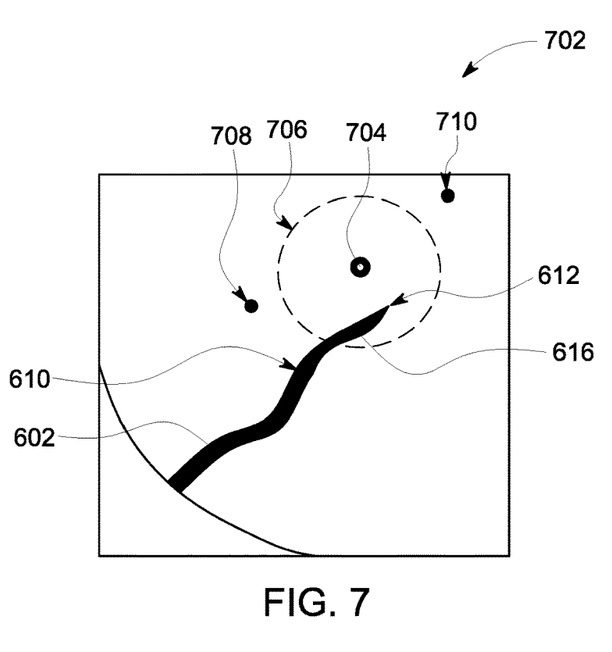
FIG. 7 is an annotated image showing the candidate feature on the rotor blade according to an embodiment.

FIG. 7 is an annotated image 702 showing the candidate feature 602 on the rotor blade 604 according to an embodiment. The annotated image 702 is the image 608 of the candidate feature 602 shown in FIG. 6B with the addition of a marker 704 indicating a predicted location of the leading end of the candidate feature 602 based on the action-guidance function. The location of the marker 704 is selected by the action-guidance function based on the state of the candidate feature 602 in FIG. 6A and the amount of time that elapsed between capturing the images 606, 608. The location of the marker 704 indicates where the action-guidance function predicts the leading end of a crack would be located after the given amount of time has elapsed from the state shown in the image 606 shown in FIG. 6A. As shown in FIG. 7, the actual measured position 612 of the leading end of the candidate feature 602 is spaced apart from the location of the marker 704. The one or more processors may determine the distance between the location of the marker 704 and the position 612 of the leading end of the candidate feature 602.

In other embodiments, the changes in the candidate feature over time may be compared to the predicted progression of the defect feature by comparing a trajectory or direction of expansion of the expanded segment 616 shown in FIG. 6B to a predicted expansion direction according to the action-guidance function, by comparing the length 614 of the expanded segment 616 to a predicted length of the expanded segment based on an expansion rate determined by the action-guidance function, or the like.

At 414, it is determined whether the measured changes in the candidate feature over time are the same or similar to the predicted progression of the defect feature according to the action-guidance function. The measured changes may be considered as at least similar to the predicted progression of the defect feature if the measured changes are within a designated range of the predicted progression. The designated range may be plus or minus a given threshold, which may depend on the property or characteristic being compared. For example, in FIG. 7, the position 612 of the leading end of the candidate feature 602 may be determined to be at least similar to the predicted progression of the defect feature if the position 612 is within a designated proximity range 706 of the marker 704 determined by the action-guidance function. The radius of the designated proximity range 706 may be a specific number of pixels, such as 50 or 100 pixels from the marker 704. Optionally, the proximity range 706 need not be circular. Since the action-guidance function cannot know the path of a crack over time with certainty, the use of the proximity range 706 provides flexibility to the detection analysis.

In an embodiment, the position 612 of the leading end of the candidate feature 602 is within the proximity range 706, so the changes in the candidate feature are determined to be the same or similar to the predicted progression of the crack according to the action-guidance function. As a result, flow of the method 400 continues to 416 and the candidate feature is identified as the defect feature, which in the illustrated embodiment is a crack. If, on the other hand, the leading end of the candidate feature was located at the position 708 or the position 710, which are both outside of the proximity range 706, then the one or more processors would have determined that the changes in the candidate feature are not the same or similar to the predicted progression of the crack. In this alternative scenario, the flow of the method 400 would continue to 420 and the candidate feature would have been identified as not representing the defect feature (e.g., a crack).

Optionally, the measured changes in the candidate feature over time can be compared to other characteristics of the predicted progression of the defect feature over time, such as the expansion rate and/or the expansion direction. For example, with reference to FIG. 6B, the trajectory or direction of the expansion segment 616 measured between the first position 610 and the second position 612 may be compared to the predicted expansion direction of a crack according to the action-guidance function. If the measured trajectory is within a designated range, such as plus or minus five, ten, or twenty degrees from the predicted expansion direction, then the changes in the candidate feature would be identified as being the same or similar to the predicted progression of a crack. In an alternative embodiment, if the candidate feature had actually expanded from the position 610 to the position 708 shown in FIG. 7, then the actual direction or trajectory may be determined to be outside of the designated range of the predicted expansion direction. As a result, the changes in the candidate feature would be determined to not be the same or similar to the predicted progression of the crack.

In another example, a measured rate of expansion of the candidate feature can be calculated by dividing the length of the expanded segment 616 by the amount of time between capturing the first and second images 606, 608. If the measured rate of expansion of the candidate feature is within a designated range, in units of length or pixels per time, of the predicted expansion rate of the crack, then the changes in the candidate feature would be identified as being the same or similar to the predicted progression of a crack. In an alternative embodiment, if the candidate feature had actually expanded from the position 610 to the position 710 shown in FIG. 7, the measured expansion rate may be determined to be outside of the designated range of the predicted expansion rate, such that the changes in the candidate feature would be determined to not be the same or similar to the predicted progression of the crack.

It is noted that the comparison between the candidate features in the image data and the predicted characteristics of cracks according to the action-guidance function is not based on visual characteristics between the candidate features and known cracks. Instead the comparison is based on changes in the candidate feature over time compared to expected or predicted progression of cracks over time.

If the candidate feature is identified as a crack at 416, then flow of the method 400 continues to 418 and appropriate responsive or remedial action is automatically taken by one or more processors. For example, upon recognizing a crack in a rotor blade, responsive action may be taken to reduce the damage to the rotor assembly or down-time resulting from repair or maintenance to the rotor assembly. The one or more processors may automatically, (i) activate an output device (e.g., audio speakers, lights, display, vibration device, etc.) to alert an operator, (ii) schedule or initiate maintenance for the rotor system, or (iii) stop movement of the rotor assembly to reduce the risk of further damage. The responsive or remedial action that is taken may depend on the type and/or properties (e.g., size, color, etc.) of the detected defect feature. For example, scheduling maintenance may be appropriate for a small crack that is detected in a blade of a rotor assembly, and automatically stopping movement of the rotor assembly may be appropriate for a large crack. The maintenance could involve, for example, spraying a restorative additive onto a thermal barrier coating of a blade of a rotor assembly. The one or more processors may automatically take the appropriate remedial action by outputting a signal to a device (e.g., an output device) or to one or more other processors, such as processors that control the movement of the rotor assembly or processors that schedule maintenance for the rotor assembly.

If, on the other hand, the candidate feature is identified at 420 as not being a crack, then the candidate feature may be merely a shadow or aspect in the image, or the candidate feature could also be another type of defect feature. For example, the action-guidance function described above corresponds to a certain type of defect feature, such as cracks. If the candidate feature is determined to not be a crack, then it is possible that the candidate feature is another defect, such as spalling, oxidation, debris, or the like, on the blade. Optionally, flow of the method 400 may return to 412, and the changes in the candidate feature over time in the image data may be compared to predicted progression of another type of defect feature according to another action-guidance function. For example, the changes in the candidate feature may be compared to predicted progression of spalling over time according to an action-guidance function associated with spalling on rotor blades. The method 400 may continue until the candidate feature is positively identified or until the candidate feature is ruled out from being any of the defect features characterized in the generated action-guidance functions.

In another embodiment, the logic of a defect feature, such as a crack or spalling in a rotor blade, can be extracted by solving an operation selection problem. For example, assume that 40 steps or actions are permitted to complete a description of spalling on a rotor blade starting from a random location along a contour of the spalling. The problem is how to select subsequent actions such that after 40 actions a chain of the actions provides a good description for (e.g., resembles) an actual representation of spalling in image data. First, edge detection (e.g., structured forest edge detection) is performed to reduce the searching space and constrain the possible positions to the contour of the object (e.g., spalling).

A function $F_{eva}(S_{-\{1, \ldots, 40\}})$ is defined to evaluate the effectiveness at which a given set or episode of 40 linked actions describes spalling. For example, a convolutional neural network (CNN) can be used as a detector that provides the evaluation function $F_{eva}(S_{-\{1, \ldots, 40\}})$. Given the locations of 40 local patches in an image depicting spalling, all of the other pixels outside of the local patches are blinded (or neglected) by assigning a value of 0 for these pixels. Then, the blinded image $I_b$ is input into the CNN detector to see how confident the features extracted from those 40 local patches can describe the spalling. Once the confidence value exceeds a threshold that is set based on experience (e.g., such as 0.6), the features in the episode of 40 local patches is determined to be sufficient or satisfactory for describing the spalling. Therefore, the reward to set up reinforcement learning is defined as the confidence value exceeding the threshold. If the confidence value exceeds the threshold, then the 40 actions $(S_{-x}, A_{-x})_{-(x=1, \ldots, 40)}$ in sequence picking the 40 local patches on object contour are treated as a gainful chain and all the actions in this chain get the reward. Otherwise, the 40 actions are classified as a non-gainful chain and none of the 40 actions gets the reward.

This evaluation is repeated iteratively many times and the $(S_{-x}, A_{-x})_{-(x=1, \ldots, 40)}$ instances for each episode are saved and used to train an action guiding function $F_{agd}(S_{-\{x\}})=A_z$. In the action guiding function, $A_z$ is the optimal action the algorithm should take in case of state $S_{-\{x\}}$, and Z is an action set. The action set Z may be defined as eight directions originating from a current position and eight different step lengths, generating 64 possible actions. Given any random location on the object contour, the algorithm extracts features from the current state, and uses the guiding function $F_{agd}(S_{-\{x\}})$ to choose the subsequent action and go to the next state on the object contour. For the action guiding function $F_{agd}(S_{-\{x\}})$, a CNN-based classifier may be used to fit the training instances $(S_{-x}, A_{-x})$. After completing a training phase based on different training samples $(S_{-x}, A_{-x})$, the embedded contour logic can be extracted out and formulated in the action guiding function $F_{agd}(S_{-\{x\}})= A_z$.

In an embodiment, a system is provided that includes one or more processors configured to obtain image data representing a rotor blade that is imaged at different times. The one or more processors are configured to analyze the image data to detect a candidate feature on the rotor blade and determine changes in the candidate feature over time. The changes in the candidate feature represent one or more of a changing size or a changing position of the candidate feature relative to the rotor blade over time. The one or more processors are further configured to identify the candidate feature on the rotor blade as a defect feature responsive to the changes in the candidate feature being one or more of the same or similar to a predicted progression of the defect feature over time. The predicted progression of the defect feature is determined according to an action-guidance function that is associated with the defect feature and generated by an artificial neural network via a machine learning algorithm. Responsive to identifying the candidate feature on the rotor blade as the defect feature, the one or more processors are configured to one or more of automatically schedule maintenance for the rotor blade, automatically alert an operator, or automatically stop movement of the rotor blade.

Optionally, the one or more processors are configured to detect the candidate feature on the rotor blade by performing edge detection on the image data to identify a subset of image patches in the image data that represents a contour of the rotor blade and then analyzing pixels in the subset of image patches to detect the candidate feature within the subset of image patches.

Optionally, the image data includes a series of images of the rotor blade acquired at different times by an imaging device. The one or more processors are configured to determine changes in the candidate feature over time by comparing the candidate features detected in at least two of the images to determine differences in one or more of numbers of pixels associated with the candidate features, lengths of the candidate features, or cross-sectional areas of the candidate features.

Optionally, the one or more processors are configured to determine, based on the analysis of the image data, that a leading end of the candidate feature transitions from a first position on the rotor blade to a second position on the rotor blade in a first amount of time. The one or more processors are configured to identify the candidate feature as the defect feature responsive to the second position of the candidate feature being within a designated proximity range of a predicted location of a leading end of the defect feature. The predicted location of the leading end is generated as an output by the action-guidance function responsive to receiving the first position of the candidate feature and the first amount of time as inputs.

Optionally, the action-guidance function includes a predicted expansion rate of the defect feature over time. The one or more processors are configured to identify the candidate feature as the defect feature responsive to the changes in the candidate feature indicating expansion of the candidate feature at a rate that is within a designated range of the predicted expansion rate of the defect feature.

Optionally, the action-guidance function includes a predicted expansion direction of the defect feature over time. The one or more processors are configured to identify the candidate feature as the defect feature responsive to the changes in the candidate feature indicating expansion of the candidate feature in a direction that is within a designated range of the predicted expansion direction of the defect feature.

Optionally, the rotor blade is a component of a turbine engine, and the defect feature is one or more of a crack in the rotor blade or spalling on a coating of the rotor blade.

In an embodiment, a method is provided that includes obtaining image data representing a rotor blade that is imaged at different times. The method includes determining changes in a candidate feature on the rotor blade over time based on image analysis of the image data. The changes in the candidate feature represent one or more of a changing size or a changing position of the candidate feature relative to the rotor blade over time. The method further includes automatically identifying the candidate feature on the rotor blade as a defect feature responsive to the changes in the candidate feature over time being one or more of the same or similar to a predicted progression of the defect feature over time according to an action-guidance function that is associated with the defect feature. The action-guidance function is generated by an artificial neural network via a machine learning algorithm.

Optionally, the method further includes performing edge detection on the image data to identify a subset of image patches in the image data that represents a contour of the rotor blade and analyzing pixels in the subset of image patches to detect the candidate feature.

Optionally, the action-guidance function includes a predicted expansion rate of the defect feature over time. The candidate feature is identified as the defect feature responsive to the changes in the candidate feature indicating expansion of the candidate feature at a rate that is within a designated range of the predicted expansion rate of the defect feature.

Optionally, the action-guidance function includes a predicted expansion direction of the defect feature over time. The candidate feature is identified as the defect feature responsive to the changes in the candidate feature indicating expansion of the candidate feature in a direction that is within a designated range of the predicted expansion direction of the defect feature.

Optionally, determining the changes in the candidate feature over time includes determining that a leading end of the candidate feature transitions from a first position on the rotor blade to a second position on the rotor blade in a first amount of time. The candidate feature is identified as the defect feature responsive to the second position of the candidate feature being within a designated proximity range of a predicted location of a leading end of the defect feature. The predicted location is generated as an output by the action-guidance function responsive to receiving the first position of the candidate feature and the first amount of time as inputs.

Optionally, the defect feature is one or more of a crack in the rotor blade or spalling on a coating of the rotor blade.

Optionally, the method further includes generating, using the artificial neural network, the action-guidance function that is used to predict the progression of the defect feature over time. The artificial neural network is trained to generate the action-guidance function by reinforcement learning using a classifier network trained to detect the defect features in images as a supervisor to provide feedback to the artificial neural network.

Optionally, responsive to the changes in the candidate feature not being the same or similar to the predicted progression of the defect feature over time, the method includes identifying the candidate feature on the rotor blade as not being the defect feature.

Optionally, the defect feature is a first defect feature in the rotor blade and the action-guidance function is a first action-guidance function associated with the predicted progression of the first defect feature over time. Responsive to identifying the candidate feature on the rotor blade as not being the first defect feature, the method includes comparing the changes in the candidate feature to a predicted progression of a different, second defect feature over time according to a different, second action-guidance function that is associated with the second defect feature to identify the candidate feature as the second defect feature.

Optionally, responsive to identifying the candidate feature on the rotor blade as the defect feature, the method further includes outputting a signal to one or more of automatically schedule maintenance for the rotor blade, automatically alert an operator, or automatically stop movement of the rotor blade.

In an embodiment, a method is provided that includes detecting a candidate feature on an object in a series of images acquired at different time and determining changes in the candidate feature relative to the object over time. The method also includes generating, using an artificial neural network, an action-guidance function that is used to predict a progression of the defect feature relative to the object over time. The action-guidance function is generated via reinforcement learning using a classifier network trained to detect the defect features in images as a supervisor to provide feedback to the artificial neural network. The method further includes automatically identifying the candidate feature on the rotor blade as the defect feature responsive to the changes in the candidate feature over time being one or more of the same or similar to the predicted progression of the defect feature according to the action-guidance function.

Optionally, determining the changes in the candidate feature over time includes determining that a leading end of the candidate feature transitions from a first position on the object to a second position on the object in a first amount of time. The candidate feature is identified as the defect feature responsive to the second position of the candidate feature being within a designated proximity range of a predicted location of a leading end of the defect feature. The predicted location is generated as an output by the action-guidance function responsive to receiving the first position of the candidate feature and the first amount of time as inputs.

Optionally, responsive to identifying the candidate feature on the object as the defect feature, the method further includes outputting a signal to one or more of automatically schedule maintenance for the object, automatically alert an operator, or automatically stop movement of the object.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
one or more processors configured to obtain image data representing a rotor blade that is imaged at different times, the one or more processors configured to analyze the image data to detect a candidate feature on the rotor blade and determine changes in the candidate feature over time, the changes in the candidate feature representing one or more of a changing size or a changing position of the candidate feature relative to the rotor blade over time,
the one or more processors further configured to identify the candidate feature on the rotor blade as a defect feature responsive to the changes in the candidate feature being one or more of the same or similar to a predicted progression of the defect feature over time, the predicted progression of the defect feature determined according to an action-guidance function that is associated with the defect feature and generated by an artificial neural network via a machine learning algorithm,
wherein, responsive to identifying the candidate feature on the rotor blade as the defect feature, the one or more processors are configured to one or more of automatically schedule maintenance for the rotor blade, automatically alert an operator, or automatically stop movement of the rotor blade.

2. The system of claim 1, wherein the one or more processors are configured to detect the candidate feature on the rotor blade by performing edge detection on the image data to identify a subset of image patches in the image data that represents a contour of the rotor blade and then analyzing pixels in the subset of image patches to detect the candidate feature within the subset of image patches.

3. The system of claim 1, wherein the image data includes a series of images of the rotor blade acquired at different times by an imaging device, the one or more processors configured to determine changes in the candidate feature over time by comparing the candidate features detected in at least two of the images to determine differences in one or more of numbers of pixels associated with the candidate features, lengths of the candidate features, or cross-sectional areas of the candidate features.

4. The system of claim 1, wherein the one or more processors are configured to determine, based on the analysis of the image data, that a leading end of the candidate feature transitions from a first position on the rotor blade to a second position on the rotor blade in a first amount of time, and
wherein the one or more processors are configured to identify the candidate feature as the defect feature responsive to the second position of the candidate feature being within a designated proximity range of a predicted location of a leading end of the defect feature, the predicted location of the leading end generated as an output by the action-guidance function responsive to receiving the first position of the candidate feature and the first amount of time as inputs.

5. The system of claim 1, wherein the action-guidance function includes a predicted expansion rate of the defect feature over time, the one or more processors configured to identify the candidate feature as the defect feature responsive to the changes in the candidate feature indicating expansion of the candidate feature at a rate that is within a designated range of the predicted expansion rate of the defect feature.

6. The system of claim 1, wherein the action-guidance function includes a predicted expansion direction of the defect feature over time, the one or more processors configured to identify the candidate feature as the defect feature responsive to the changes in the candidate feature indicating expansion of the candidate feature in a direction that is within a designated range of the predicted expansion direction of the defect feature.

7. The system of claim 1, wherein the rotor blade is a component of a turbine engine, and the defect feature is one or more of a crack in the rotor blade or spalling on a coating of the rotor blade.

8. A method comprising:
obtaining image data representing a rotor blade that is imaged at different times;
determining changes in a candidate feature on the rotor blade over time based on image analysis of the image data, the changes in the candidate feature representing one or more of a changing size or a changing position of the candidate feature relative to the rotor blade over time; and
automatically identifying the candidate feature on the rotor blade as a defect feature responsive to the changes in the candidate feature over time being one or more of the same or similar to a predicted progression of the defect feature over time according to an action-guidance function that is associated with the defect feature, the action-guidance function generated by an artificial neural network via a machine learning algorithm.

9. The method of claim 8, further comprising performing edge detection on the image data to identify a subset of image patches in the image data that represents a contour of the rotor blade, and analyzing pixels in the subset of image patches to detect the candidate feature.

10. The method of claim 8, wherein the action-guidance function includes a predicted expansion rate of the defect feature over time, and the candidate feature is identified as the defect feature responsive to the changes in the candidate feature indicating expansion of the candidate feature at a rate that is within a designated range of the predicted expansion rate of the defect feature.

11. The method of claim 8, wherein the action-guidance function includes a predicted expansion direction of the defect feature over time, and the candidate feature is identified as the defect feature responsive to the changes in the candidate feature indicating expansion of the candidate feature in a direction that is within a designated range of the predicted expansion direction of the defect feature.

12. The method of claim 8, wherein determining the changes in the candidate feature over time includes determining that a leading end of the candidate feature transitions from a first position on the rotor blade to a second position on the rotor blade in a first amount of time, and
wherein the candidate feature is identified as the defect feature responsive to the second position of the candidate feature being within a designated proximity range of a predicted location of a leading end of the defect feature, the predicted location generated as an output by the action-guidance function responsive to receiving the first position of the candidate feature and the first amount of time as inputs.

13. The method of claim 8, wherein the defect feature is one or more of a crack in the rotor blade or spalling on a coating of the rotor blade.

14. The method of claim 8, further comprising generating, using the artificial neural network, the action-guidance function that is used to predict the progression of the defect feature over time, the artificial neural network trained to generate the action-guidance function by reinforcement learning using a classifier network trained to detect the defect features in images as a supervisor to provide feedback to the artificial neural network.

15. The method of claim 8, wherein, responsive to the changes in the candidate feature not being the same or similar to the predicted progression of the defect feature over time, the method includes identifying the candidate feature on the rotor blade as not being the defect feature.

16. The method of claim 15, wherein the defect feature is a first defect feature in the rotor blade and the action-guidance function is a first action-guidance function associated with the predicted progression of the first defect feature over time, and, responsive to identifying the candidate feature on the rotor blade as not being the first defect feature, the method includes comparing the changes in the candidate feature to a predicted progression of a different, second defect feature over time according to a different, second action-guidance function that is associated with the second defect feature to identify the candidate feature as the second defect feature.

17. The method of claim 8, wherein, responsive to identifying the candidate feature on the rotor blade as the defect feature, the method further comprises outputting a signal to one or more of automatically schedule maintenance for the rotor blade, automatically alert an operator, or automatically stop movement of the rotor blade.

18. A method comprising:
- detecting a candidate feature on an object in a series of images acquired at different time and determining changes in the candidate feature relative to the object over time;
- generating, using an artificial neural network, an action-guidance function that is used to predict a progression of the defect feature relative to the object over time, the action-guidance function generated via reinforcement learning using a classifier network trained to detect the defect features in images as a supervisor to provide feedback to the artificial neural network; and
- automatically identifying the candidate feature on the rotor blade as the defect feature responsive to the changes in the candidate feature over time being one or more of the same or similar to the predicted progression of the defect feature according to the action-guidance function.

19. The method of claim 18, wherein determining the changes in the candidate feature over time includes determining that a leading end of the candidate feature transitions from a first position on the object to a second position on the object in a first amount of time, and
- wherein the candidate feature is identified as the defect feature responsive to the second position of the candidate feature being within a designated proximity range of a predicted location of a leading end of the defect feature, the predicted location generated as an output by the action-guidance function responsive to receiving the first position of the candidate feature and the first amount of time as inputs.

20. The method of claim 18, wherein, responsive to identifying the candidate feature on the object as the defect feature, the method further comprises outputting a signal to one or more of automatically schedule maintenance for the object, automatically alert an operator, or automatically stop movement of the object.

* * * * *